US008632717B2

(12) United States Patent
Hong et al.

(10) Patent No.: US 8,632,717 B2
(45) Date of Patent: Jan. 21, 2014

(54) METHOD OF NANOIMPRINTING A PIEZOELECTRIC POLYMERIC MATERIAL FOR FORMING HIGH ASPECT RATIO NANOPILLARS

(75) Inventors: Chien-Chong Hong, Zhubei (TW); Sheng-Yuan Huang, Xinbei (TW)

(73) Assignee: National Tsing Hua University, Hsinchu (TW)

( * ) Notice: Subject to any disclaimer, the term of this patent is extended or adjusted under 35 U.S.C. 154(b) by 227 days.

(21) Appl. No.: 13/204,168

(22) Filed: Aug. 5, 2011

(65) Prior Publication Data

US 2012/0276333 A1    Nov. 1, 2012

(30) Foreign Application Priority Data

Apr. 27, 2011    (TW) .............. 100114651 A

(51) Int. Cl.
*B29C 67/24*     (2006.01)
*B28B 11/08*     (2006.01)
*B32B 27/32*     (2006.01)

(52) U.S. Cl.
USPC ............ 264/330; 264/293; 264/299; 264/319

(58) Field of Classification Search
USPC ................. 264/293, 299, 319, 330; 428/220; 977/778, 782
See application file for complete search history.

(56) References Cited

PUBLICATIONS

Becker et al. (Hot embossing as a method for the fabrication of polymer high aspect ratio structures. Sensors and Actuators 83 (2000) pp. 130-135).*

Li et al. (Flexible Done and Bump Shape Piezoelectric Tactile Sensors Using PVDF-TrFE Copolymer. Journal of Microelectromechanical Systems, vol. 17, No. 2, Apr. 2008, pp. 334-341).*
Park et al. (Large Area High Density Sub-20 nm SiO2 Nanostructures Fabricated by Block Copolymer Template for Nanoimprint Lithography. ACS Nano, vol. 3, No. 9, pp. 2601-2608).*
Park et al. (Micropatterning of semicrystalline poly(vinylidene fluoride) (PVDF) solutions. European Polymer Journal 41 (2005) pp. 1001-1012).*
Fang et al. (Nanoimprint of ordered ferro-piezoelectric P(VDF-TrFE) nanostructures. Microelectronic Engineering 88 (2011) pp. 2033-2036).*
Fang et al. (Influence of nano-embossing on properties of poly(VDF-TrFE. Microelectronic Engineering 87 (2010) pp. 890-890).*
Hu et al. (Regular arrays of highly ordered ferroelectric polymer nanostructures for non-volatile low-voltage memories. Nature Materials, vol. 8, Jan. 2009, pp. 62-67).*
Zhang et al. (Microimprinting and ferroelectric properties of poly(vinylidene fluoride-tetrafluoroethylene) copolymer films. Applied Physics Letters 91, 172906 (2007) pp. 1-3).*

(Continued)

*Primary Examiner* — Atul P. Khare
(74) *Attorney, Agent, or Firm* — Birch, Stewart, Kolasch & Birch, LLP

(57) ABSTRACT

A method of nanoimprinting a piezoelectric polymeric material includes: heating a surface of the piezoelectric polymeric material to an imprinting temperature greater than $(T_c-25)°$ C. and less than $T_c$, in which $T_c$ is the Curie temperature of the piezoelectric polymeric material; and pressing the heated surface of the piezoelectric polymeric material using a nanoimprinting template having a nanopillar structure so as to form the piezoelectric polymeric material with high aspect ratio nanopillars.

5 Claims, 5 Drawing Sheets

(56) References Cited

PUBLICATIONS

Hu et al. (Nanoscale Control of Polymer Crystallization by Nanoimprint Lithography. Nano Letters, vol. 5, No. 9 (2005) pp. 1738-1743).*

Kang et al. (Localized Pressure-Induced Ferroelectric Pattern Arrays of Semicrystalline Poly(vinylidene fluoride) by Microimprinting. Advanced Materials, vol. 19 (2007) pp. 581-586).*

Liu et al. (Rapid Nanoimprinting and Excellent Piezoresponse of Polymeric Ferroelectric Nanostructures. ACS Nano, vol. 4, No. 1, pp. 83-90).*

* cited by examiner

METHOD OF NANOIMPRINTING A PIEZOELECTRIC POLYMERIC MATERIAL FOR FORMING HIGH ASPECT RATIO NANOPILLARS

CROSS-REFERENCE TO RELATED APPLICATION

This application claims priority of Taiwanese application no. 100114651 filed on Apr. 27, 2011.

BACKGROUND OF THE INVENTION

1. Field of the Invention

The invention relates to a method of nanoimprinting a piezoelectric polymeric material using a nanoimprinting template under an imprinting temperature less than the Curie temperature of the piezoelectric polymeric material for forming high aspect ratio nanopillars.

2. Description of the Related Art

Piezoelectric materials can be used for making transducers, and include ceramic type and polymeric type piezoelectric materials. In "Flexible Dome and Bump Shape Piezoelectric Tactile Sensors Using PVDF-TrFE Copolymer," Journal of Microelectromechanical Systems, 2008, 17, 334-341, Chunyan Li et al. disclose a sensor made from a piezoelectric material having a microstructure that can improve the sensitivity of the sensor. The microstructure is in micro scale and is formed by spin-coating techniques.

In "Large Area High Density Sub-20 nm $SiO_2$ Nanostructures Fabricated by Block Copolymer Template for Nanoimprint Lithography," 2009 American Chemical Society, Vol. 3, No. 9, 2601-2608, 2009, Park et al. disclose a nanoimprinting method for forming large area high density sub-20 nanometer nanopillars or nanoholes. The conventional method can form sub-20 nanometer nanopillars or nanoholes on materials, such as polymethyl methacrylate (PMMA), poly(dimethylsiloxane) (PDMS), and poly(3-hexylthiophene) (P3HT). However, the conventional method can only produce nanopillars having a low aspect ratio (up to 2.5 only). In the field of material science, an aspect ratio of less than 5 is considered as a low aspect ratio.

In addition, it is commonly known in the art that when it is desired to form pillars on a material, the imprinting template used for imprinting is required to have holes formed therein, and when it is desired to form holes in the material, the imprinting template is required to have pillars formed thereon.

SUMMARY OF THE INVENTION

The object of the present invention is to provide a method of nanoimprinting a piezoelectric polymeric material that can form high aspect ratio nanopillars.

According to the present invention, there is provided a method of nanoimprinting a piezoelectric polymeric material for forming high aspect ratio nanopillars. The method includes: heating a surface of the piezoelectric polymeric material to an imprinting temperature greater than $(T_c-25)°$ C. and less than $T_c$, in which $T_c$ is the Curie temperature of the piezoelectric polymeric material; and pressing the heated surface of the piezoelectric polymeric material using a nanoimprinting template having a nanopillar structure so as to form the piezoelectric polymeric material with high aspect ratio nanopillars.

BRIEF DESCRIPTION OF THE DRAWINGS

In drawings which illustrate an embodiment of the invention.

DETAILED DESCRIPTION OF THE PREFERRED EMBODIMENT

Figure 1A:
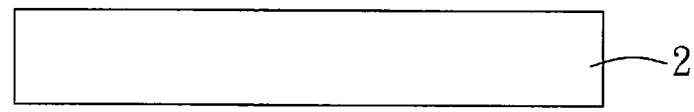
FIGS. 1A to 1F are schematic views illustrating consecutive steps of the preferred embodiment of a method of nanoimprinting a piezoelectric polymeric material for forming nanopillars.
Figure 1B:
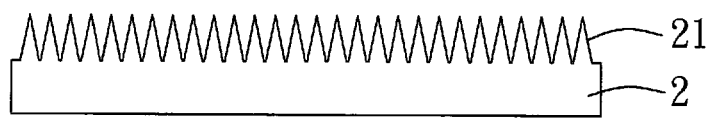
Figure 1C:
Figure 1D:
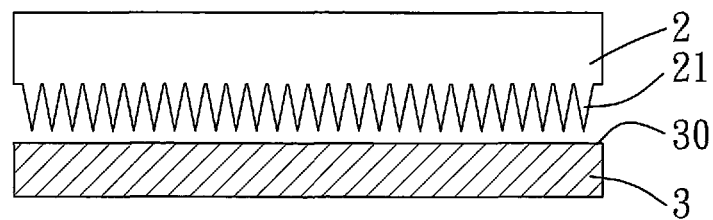
Figure 1E:
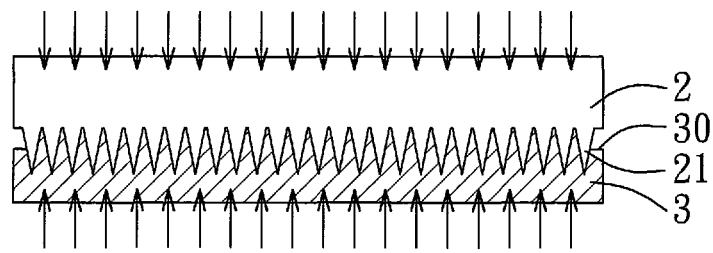
Figure 1F:
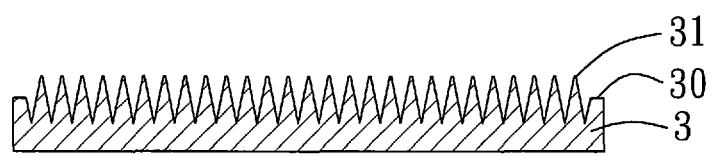

FIGS. 1A to 1F illustrate consecutive steps of the preferred embodiment of a method of nanoimprinting a piezoelectric polymeric material 3 for forming high aspect ratio nanopillars 31. The method includes: preparing a silicon wafer 2' (see FIG. 1A); etching the silicon wafer 2' using hydrogen plasma techniques in a conventional manner to form the silicon wafer 2' into a nanoimprinting template 2 that has a nanopillar structure with a plurality of tapered template nanopillars 21 (see FIG. 1B); subjecting the nanoimprinting template 2 to fluorination to form an anti-sticking layer 211 on outer surfaces of the template nanopillars 21 (see FIG. 1C); heating a surface 30 of the piezoelectric polymeric material 3 to an imprinting temperature greater than $(T_c-25)°$ C. and less than $T_c$, in which $T_c$ is the Curie temperature of the piezoelectric polymeric material 3; pressing the heated surface 30 of the piezoelectric polymeric material 3 using the nanoimprinting template 2 under a predetermined load so as to form the piezoelectric polymeric material 3 that has the nanopillars 31 with a high aspect ratio (see FIGS. 1D and 1E); and separating the piezoelectric polymeric material 3 from the nanoimprinting template 2 (see FIG. 1F). The piezoelectric polymeric material 3 exhibits the piezoelectric property, and has different crystalline phrases which are present either in one single phase form or in a combined phrase form under different temperature ranges. When the temperature of the piezoelectric polymeric material 3 approaches its Curie temperature $(T_c)$, the piezoelectric property and the crystalline form thereof undergo change in an extent such that formation of the nanopillars 31 can be realized.

Preferably, the imprinting temperature is greater than $(T_c-20)°$ C. and less than $(T_c-10)°$ C. so as to achieve the formation of a higher density of the nanopillars 31.

Preferably, the piezoelectric polymeric material 3 is a copolymer of monomers containing vinylidene fluoride, and more preferably, is a copolymer of vinylidene fluoride and trifluoroethylene (PVDF-TrFE). Preferably, the PVDE-TrFE copolymer has a molar ratio of 75:25 for vinylidene fluoride to trifluoroethylene, which has a glass transition temperature ($T_g$) of about −39° C., a Curie temperature ($T_c$) of about 106° C., and a melting temperature ($T_m$) of about 155° C.

Preferably, the nanopillars 31 of the piezoelectric polymeric material 3 formed by the preferred embodiment are tapered in shape and have an aspect ratio greater than 5 and less than 10. Preferably, the nanopillars 31 of the piezoelectric polymeric material 3 are conical or pyramid in shape and have a maximum width greater than 10 nm and less than 50 nm.

The following Examples and Comparative Examples are provided to illustrate the merits of the preferred embodiment of the invention, and should not be construed as limiting the scope of the invention.

EXAMPLE 1 (E1)

Figure 2:
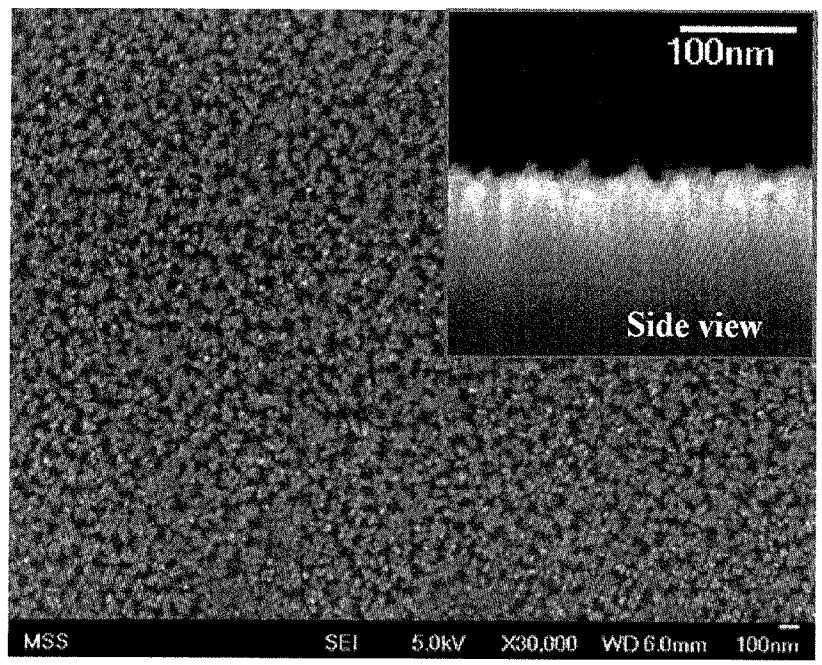
FIG. 2 is an SEM photo showing the structure of nanopillars of a nanoimprinting template used in the method of the preferred embodiment.

A silicon wafer (6 inches) was etched using hydrogen plasma etching techniques with an etching time of about 10 minutes so as to form a nanoimprinting template 2 with a plurality of tapered template nanopillars 21 (see FIG. 2) having a maximum width of about 20 nm and an aspect ratio of about 7.5. The template nanopillars 21 were subjected to fluorination to form an anti-sticking layer 211 on outer surfaces of the template nanopillars 21. The nanoimprinting template 2 was fixed to a nanoimprinter.

Figure 3:
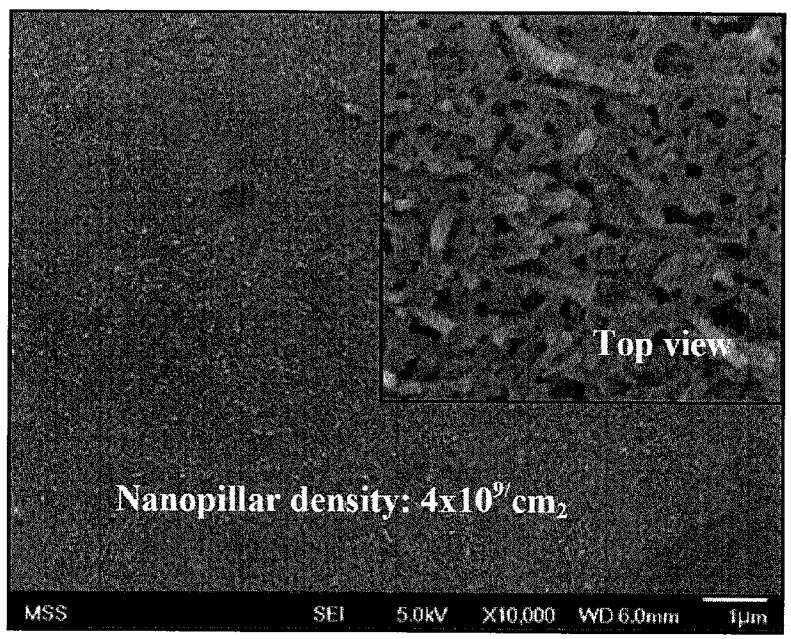
FIG. 3 is an SEM photo showing the structure of the nanopillars of a piezoelectric polymeric material of Example 1 made by the method of the preferred embodiment under an imprinting temperature of 90° C.

A powder of PVDF-TrFE (molar ratio 70:25 for PVDF: TrFE) was dissolved in a solvent of ethlmethylketone (MEK) to form a solution. The solution was applied to a temporary substrate, followed by drying so as to form a PVDF-TrFE film 3 on the temporary substrate. The PVDF-TrFE film 3 was peeled from the temporary substrate and was fixed to the nanoimprinter at a position opposite to the nanoimprinting template 2. The nanoimprinting template 2 was heated to 90° C., and was driven by the nanoimprinter to press against the PVDF-TrFE film 3 under an imprinting load of about 1 Mpa and to simultaneously heat the PVDF-TrFE film 3 to an imprinting temperature of about 90° C. The imprinting time lasted for about 30 minutes so as to form nanopillars 31 on the PVDF-TrFE film 3. FIG. 3 is an SEM photo showing the nano-structure of the nanopillars 31 of Example 1. The nanopillars 31 thus formed have a maximum width of about 20 nm and an aspect ratio of 7.5. The density of the nanopillars 31 is about $4 \times 10^9/cm^2$.

EXAMPLE 2

Figure 4:
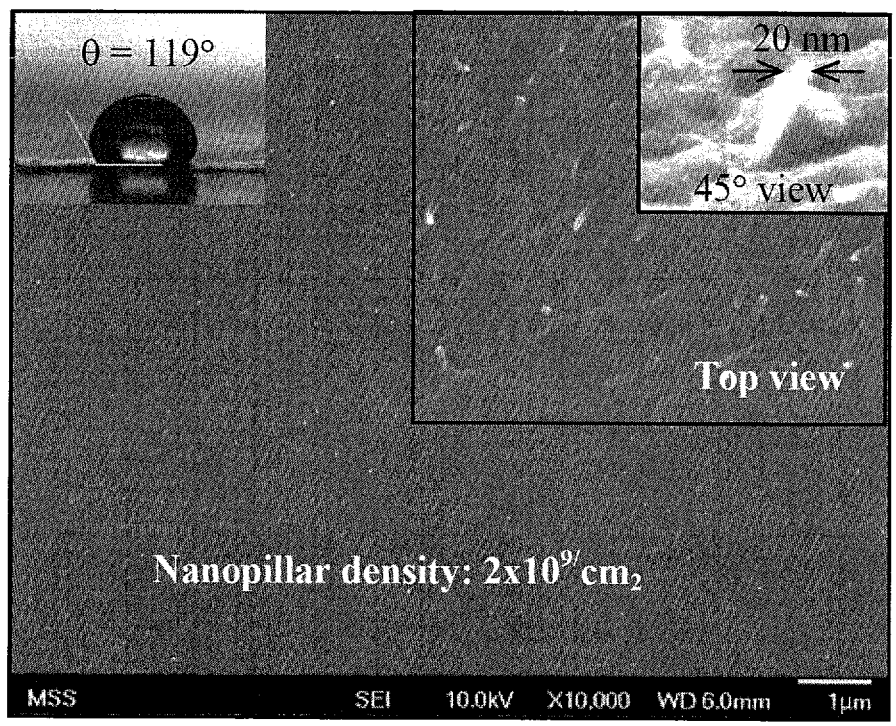
FIG. 4 is an SEM photo showing the structure of the nanopillars of a piezoelectric polymeric material of Example 2 made by the method of the preferred embodiment under an imprinting temperature of 95° C.

Example 2 differs from Example 1 in that the nanoimprinting template 2 and the PVDF-TrFE film 3 were heated to about 95° C. FIG. 4 is an SEM photo showing the nano-structure of the nanopillars 31 of Example 2. The nanopillars 31 thus formed have a maximum width of about 20 nm and an aspect ratio of 7.5. The density of the nanopillars is about $2 \times 10^9/cm^2$.

COMPARATIVE EXAMPLE 1

Figure 5:
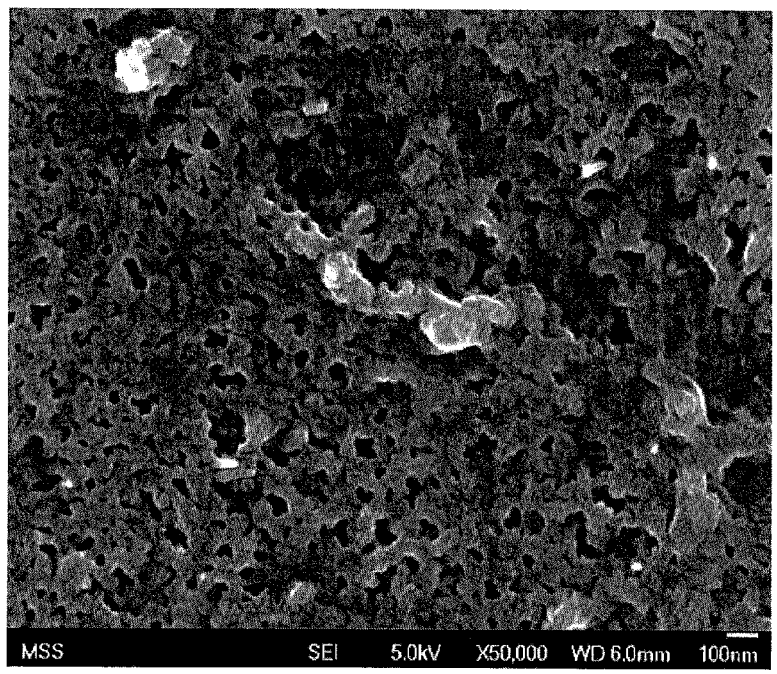
FIG. 5 is an SEM photo showing the structure of the nanopillars of a piezoelectric polymeric material of Comparative Example 1 which is formed under an imprinting temperature of 80° C.

Comparative Example 1 differs from Example 1 in that the nanoimprinting template and the PVDF-TrFE film were heated to about 80° C. FIG. 5 is an SEM photo showing the structure of the imprinted PVDF-TrFE film 3. Substantially no nanopillars can be found on the imprinted PVDF-TrFE film.

COMPARATIVE EXAMPLE 2

Figure 6:
FIG. 6 is an SEM photo showing the structure of the nanopillars of a piezoelectric polymeric material of Comparative Example 2 which is formed under an imprinting temperature of 110° C.

Comparative Example 2 differs from Example 1 in that the nanoimprinting template and the PVDF-TrFE film were heated to about 110° C. FIG. 6 is an SEM photo showing the structure of the imprinted PVDF-TrFE film. Substantially no nanopillars can be found on the imprinted PVDF-TrFE film.

The results of Examples 1 and 2 show a drastic change in the density of the nanopillars 31 when the imprinting temperature varies from 90° C. to 95° C. The drastic change is most likely attributed to a considerable change in the piezoelectric property and the crystalline form of the piezoelectric polymeric material 3.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method of nanoimprinting a film of piezoelectric polymeric material for forming high aspect ratio nanopillars, the method comprising:
    heating a surface of the piezoelectric polymeric film to an imprinting temperature greater than $(T_c-25)°$ C. and less than $T_c$, in which $T_c$ is the Curie temperature of the piezoelectric polymeric material; and
    pressing the heated surface of the piezoelectric polymeric film using a nanoimprinting template having a high aspect ratio nanopillar structure so as to form high aspect ratio nanopillars on the piezoelectric polymeric film,
    wherein the piezoelectric polymeric material is a copolymer having monomers of vinylidene fluoride.

2. The method of claim 1, wherein the imprinting temperature is greater than $(T_c-20)°$ C. and less than $(T_c-10)°$ C.

3. The method of claim 1, wherein the piezoelectric polymeric material is a copolymer of vinylidene fluoride and trifluoroethylene.

4. The method of claim 3, wherein the copolymer has a molar ratio of 75:25 for vinylidene fluoride to trifluoroethylene.

5. The method of claim 1, wherein the nanopillar structure of the nanoimprinting template comprises a plurality of tapered nanopillars.

* * * * *